US008322611B2

(12) United States Patent
Ueda

(10) Patent No.: US 8,322,611 B2
(45) Date of Patent: Dec. 4, 2012

(54) COMMODITY SALES DATA PROCESSING APPARATUS AND CONTROL METHOD THEREFOR

(75) Inventor: Hiroyuki Ueda, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/623,601

(22) Filed: Nov. 23, 2009

(65) Prior Publication Data

US 2010/0127077 A1 May 27, 2010

(30) Foreign Application Priority Data

Nov. 26, 2008 (JP) ................................ 2008-301376

(51) Int. Cl.
*G06K 19/00* (2006.01)

(52) U.S. Cl. ......................... 235/383; 235/375; 235/381

(58) Field of Classification Search .................. 235/375, 235/381, 383
See application file for complete search history.

(56) References Cited

U.S. PATENT DOCUMENTS

| | | | | |
|---|---|---|---|---|
| 6,504,649 | B1 * | 1/2003 | Myers | 359/454 |
| 7,044,370 | B2 * | 5/2006 | Bellis et al. | 235/383 |
| 2005/0190329 | A1 * | 9/2005 | Okumura | 349/123 |
| 2008/0151147 | A1 * | 6/2008 | Weber et al. | 349/96 |

FOREIGN PATENT DOCUMENTS

| | | |
|---|---|---|
| CN | 1985281 | 6/2007 |
| CN | 101169491 | 4/2008 |
| JP | 2001-023042 | 1/2001 |
| JP | 2005-049917 | 2/2005 |
| JP | 2006-235906 | 9/2006 |
| JP | 2006-259930 | 9/2006 |
| JP | 2008-107404 | 5/2008 |

OTHER PUBLICATIONS

Japanese Office Action for 2008-301376 mailed on Oct. 26, 2010.
Japanese Office Action for Application No. 2008-301376 mailed on Apr. 19, 2011.
Chinese Office Action for Chinese Application No. 2011111100570640 mailed on Nov. 16, 2011.
Chinese Office Action for Chinese Application No. 200910223900.1 mailed on Nov. 16, 2011.

* cited by examiner

*Primary Examiner* — Michael G Lee
*Assistant Examiner* — Matthew Mikels
(74) *Attorney, Agent, or Firm* — Turocy & Watson, LLP

(57) ABSTRACT

A commodity sales data processing apparatus including a display unit configured to display various kinds of information includes an angle-of-field setting unit configured to set an angle of field of a display screen of the display unit to a first angle of field or a second angle of field narrower than the first angle of field. When checkout processing is started, an angle-of-field control section of the commodity sales data processing apparatus causes the angle-of-field setting unit to operate and set the angle of field of the display screen of the display unit to the second angle of field.

5 Claims, 3 Drawing Sheets

COMMODITY SALES DATA PROCESSING APPARATUS AND CONTROL METHOD THEREFOR

CROSS REFERENCE TO RELATED APPLICATION

This application is based upon and claims the benefit of priority from the prior Japanese Patent Application No. 2008-301376, filed Nov. 26, 2008, the entire contents of which are incorporated herein by reference.

TECHNICAL FIELD

The present invention relates to a commodity sales data processing apparatus used for checkout processing in commodity sales stores such as a supermarket and a convenience store and a control method therefor.

BACKGROUND

In the past, a commodity sales data processing apparatus such as a POS (Point Of Sales) terminal is used for checkout processing in commodity sales stores such as a supermarket and a convenience store. The commodity sales data processing apparatus includes an operator side display that displays processing content to an operator, a customer side display that displays checkout information and the like to a customer, a scanner that reads barcodes attached to commodities, a keyboard that receives the input of characters and the like by the depression of operation keys, and a card reader that reads information stored in a magnetic card such as a credit card.

The operator side display is designed to have a wide angle of field to allow an operator to visually recognize displayed content even if an angle for viewing a screen changes because of the difference in height of operators, the slight difference in posture during work, or the like. It is a general practice to also set, taking into account display performed to aim at the effectiveness of advertising such as commercial videos, the customer side display to have a wide angle of field to allow the customer to visually recognize displayed content from various angles.

In recent years, a self-type commodity sales data processing apparatus is spreading. In checkout processing employing the self-type commodity sales data processing apparatus, a customer, rather than an operator, carries out a series of operation. Therefore, for a store, there is an advantage that personnel expenses for operators can be reduced. Further, for customers, there is an advantage that privacy is protected because purchased commodities are not known by the operators.

When the settlement of a transaction is performed by using a credit card or a debit card or when a point, card is used, personal information such as a credit card number, age, sex, a name, the number of points of a customer could be displayed on the operator side display. Therefore, from the viewpoint of protection of the personal information, some store takes measures of bonding a film having a very small louver layer to the surface of the operator side display to narrow the angle of field.

As a technique for protecting the personal information displayed on the screen in the same manner, a display apparatus disclosed in JP-A-2006-259930 is known. This display apparatus includes peep preventing means, an image photographing device, and counting means for detecting faces images with the image photographing device and counting the number of detected face images. When plural face images are counted by the counting means, the peep preventing means is caused to operate.

As described in JP-A-2008-107404, a display apparatus is developed that can electrically adjust an angle of field using a transparent-scattering switching element such as PNLC (Polymer Network Liquid Crystal) having polymer dispersion liquid crystal nipped by substrates provided with transparent electrodes.

In the display apparatus disclosed in JP-A-2008-107404, the refractive indexes of a polymer chain and the polymer dispersion liquid crystal are the same in a state in which voltage is applied between the transparent electrode pair. The transparent-scattering switching element changes to a transparent state. In this state, since an emission angle range of light emitted from a light source is limited, an angle of field of a display screen is narrowed. On the other hand, in a state in which voltage is not applied between the transparent electrode pair, the refractive indexes of the polymer chain and the polymer dispersion liquid crystal are different. In this state, the light emitted from the light source scatters when the light passes through the transparent-scattering switching element. Therefore, since the emission angle range of the light emitted from the light source is expanded, the angle of field of the display screen is widened.

On a display included in the self-type commodity sales data processing apparatus, commercial information for advertising commodities and a store, guidance of an operation method, and the like are displayed. Therefore, usually, an angle of field of the display is designed wide in order to improve the visibility of a display screen.

On the display, for example, information concerning commodities registered as purchased commodities is displayed besides the commercial information, the guidance, and the like. Among customers, there are many customers who hate that information concerning purchased commodities are known by others. However, since the angle of field of the display is designed wide as explained above, there is the probability that, especially during busy time of a store, information concerning commodities displayed on the display is known by, for example, other customers waiting in line behind a customer who is operating the commodity sales data processing apparatus.

As explained above, when the film having the very small louver layer is bonded to the display to cope with such a problem, the angle of field is always narrowed and the effectiveness of advertising by the commercial information cannot be obtained. It is always difficult for the customer who is operating the commodity sales data processing apparatus to see an operation screen. Therefore, even when the customer is performing processing that may be peeped, it is difficult to perform operation. In the case of a display with a pressure sensitive touch panel bonded to a display to enable touch operation, input sensitivity of the touch panel falls.

In the technique disclosed in JP-A-2006-259930, the peep preventing means is caused to operate according to only the number of face images shown on the image photographing device irrespectively of content displayed on the display screen. Therefore, the peep preventing means operates even when content that may be seen by anybody such as commercial information is only displayed.

SUMMARY

The present invention has been devised in view of such circumstances and it is an object of the present invention to provide a commodity sales data processing apparatus that can automatically adjust an angle of field and prevent a peep without deteriorating the effectiveness of advertising by screen display and operability of a display and a control method therefor.

A commodity sales data processing apparatus according to an aspect of the present invention includes: a display unit configured to display various kinds of information; an angle-of-field setting unit configured to set an angle of field of a display screen of the display unit to a first angle of field or a second angle of field narrower than the first angle of field; a checkout processing section configured to perform checkout processing for a commercial transaction; and an angle-of-field control section configured to cause the angle-of-field setting unit to operate and set the angle of field of the display screen of the display unit to the second angle of field when the checkout processing is started by the checkout processing section.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

An embodiment of the present invention is explained below with reference to the accompanying drawings.

This embodiment is an example in which the present invention is applied to a self-type commodity sales data processing apparatus 1 that completes a series of checkout processing according to operation by a customer.

Figure 1:
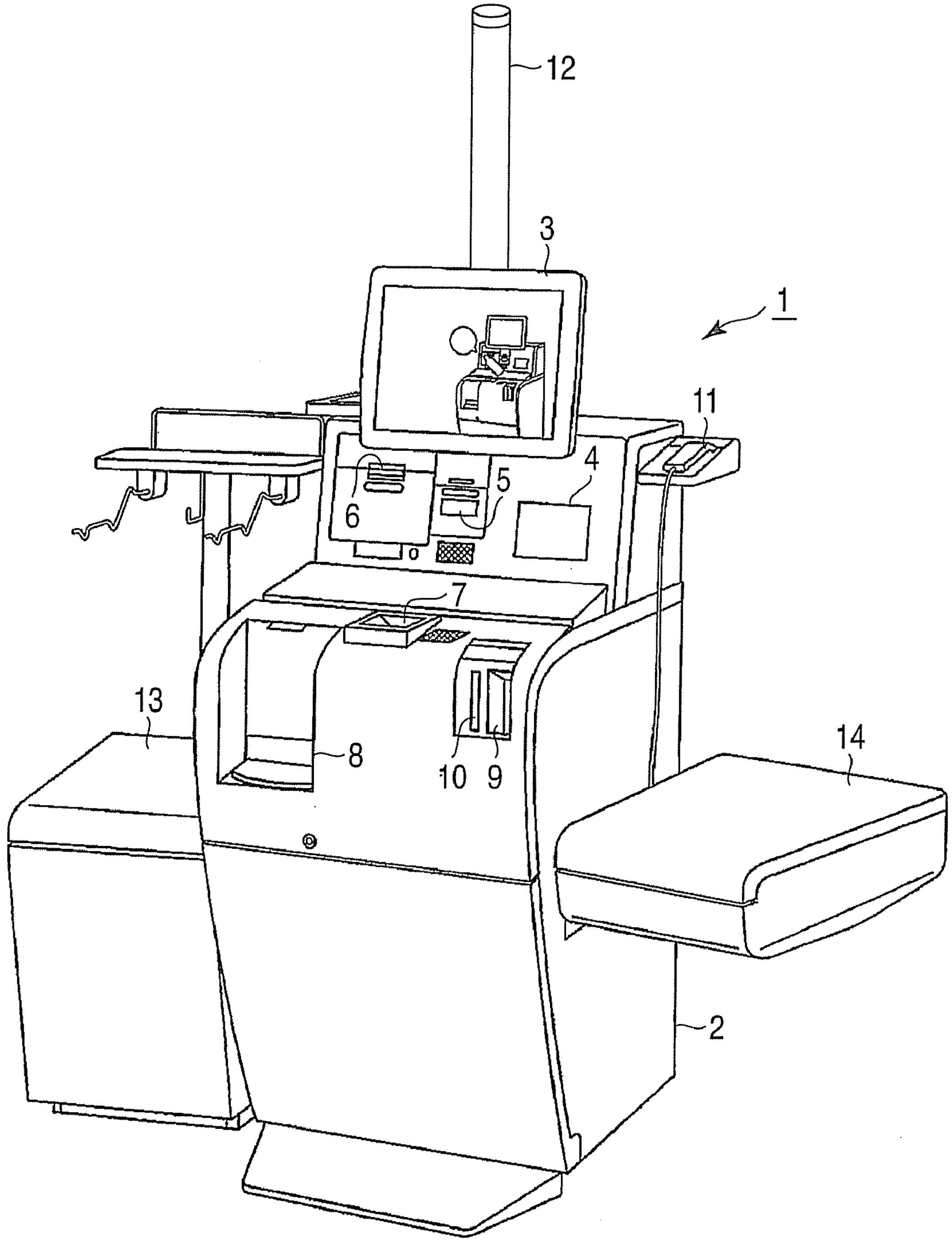
FIG. 1 is an external perspective view of a commodity sales data processing apparatus according to an embodiment of the present invention.

FIG. 1 is an external perspective view of the commodity sales data processing apparatus 1.

The commodity sales data processing apparatus 1 includes a main body 2, a display 3 as a display unit in this embodiment, a vertical scanner 4, a card insertion port 5, a receipt issue port 6, a coin input port 7, a coin discharge port 8, a bill input port 9, a bill discharge port 10, a hand-held scanner 11, and a communication unit 12. A commodity placing table 13 for placing commodities for which payment is not settled yet is provided on the left side of the main body 2. A commodity placing table 14 for placing commodities for which payment is settled is provided on the right side of the main body 2.

The display 3 is an LCD (Liquid Crystal Display) with a touch panel to which information can be input by touch operation of a customer. The display 3 selectively displays guidance information for informing customers of an operation method, commercial information of a store and commodities, an information input screen for inputting commodity information of commodities not attached with barcodes, information concerning commodities, barcodes of which are read by the vertical scanner 4 or the hand-held scanner 11, a total purchase amount, a deposit amount, and a change amount, and the like.

The vertical scanner 4 optically reads barcodes attached to commodities or wrappings of the commodities held over the vertical scanner 4 by a customer. Various magnetic cards such as a credit card, a debit card, and a customer point card are inserted in the card insertion port 5. The receipt issue port 6 is an issue port for a receipt when checkout processing is completed. The coin input port 7 is an input port for coins for settlement. The coin discharge port 8 is a return port for change coins. The bill input port 9 is an input port for bills for settlement. The bill discharge port 10 is a return port for change bills. The hand-held scanner 11 is used when a customer manually reads barcodes of commodities.

The communication unit 12 performs radio communication with an access point installed in the store and controls communication with a network in the store connected to the access point.

Figure 2:
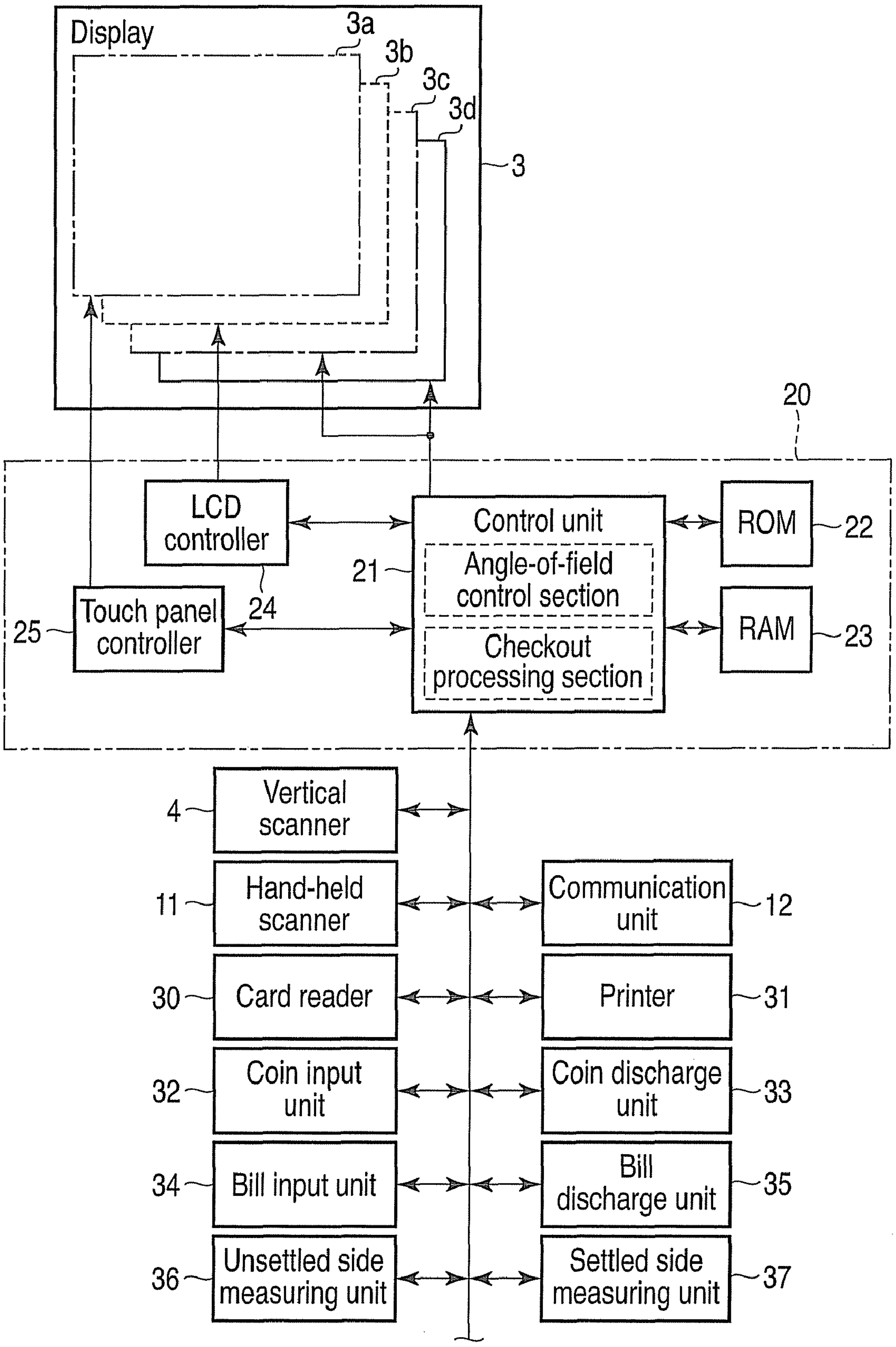
FIG. 2 is a block diagram of a control circuit of the commodity sales data processing apparatus according to the embodiment.

A control circuit of the commodity sales data processing apparatus 1 is explained. FIG. 2 is a block diagram of the control circuit of the commodity sales data processing apparatus 1. The control circuit is configured by connecting the display 3, the vertical scanner 4, the hand-held scanner 11, the communication unit 12, a card reader 30, a printer 31, a coin input unit 32, a coin discharge unit 33, a bill input unit 34, a bill discharge unit 35, an unsettled side measuring unit 36, and a settled side measuring unit 37 to a circuit 20 incorporated in the main body 2.

The card reader 30 reads information stored in a magnetic card inserted from the card insertion port 5. The printer 31 prints content of a transaction on a receipt sheet and discharges the receipt sheet from the receipt issue port 6. The coin input unit 32 processes coins input in the coin input port 7. The coin discharge unit 33 processes coins discharged to the coin discharge port 8. The bill input unit 34 processes bills input in the bill input port 9. The bill discharge unit 35 processes bills discharged to the bill discharge port 10. The unsettled side measuring unit 36 measures the weight of commodities placed on the commodity placing table 13. The settled side measuring unit 37 measures the weigh of commodities placed on the commodity placing table 14.

The circuit 20 is configured by connecting a ROM (Read Only Memory) 22, a RAM (Random Access Memory) 23, an LCD controller 24, and a touch panel controller 25 to a control unit 21 via bus lines such as an address bus and a data bus. A display screen of the display 3 is configured by superimposing a touch panel 3*a*, an LCD panel 3*b*, a sheet polarizer 3*c* as an angle-of-field setting unit, and a backlight system 3*d*, which have substantially the same sizes, in order from the top surface in a display direction.

The control unit 21 is main control means for the commodity sales data processing apparatus 1 including a CPU (Central Processing Unit) and a memory system. The ROM 22 has stored therein stationary information such as a computer program necessary for the operation of the commodity sales data processing apparatus 1. The RAM 23 forms storage areas for various kinds of work according to processing scenes. The LCD controller 24 includes a controller that controls image display on the LCD panel 3*b*. The touch panel controller 25 includes a controller that detects a touch operation position on the touch panel 3*a*. The touch operation position detected by the touch panel controller 25 is transmitted to the control unit 21. The backlight systems 3*d* is turned on or off according to the reception of a predetermined control signal from the control unit 21.

The sheet polarizer 3*c* includes transparent-scattering switching elements such as PNLC. A predetermined voltage signal is applied to the entire sheet polarizer 3*c* according to the output of the predetermined control signal from the control unit 21.

In a state in which the voltage signal is not applied to the sheet polarizer 3*c*, light emitted from the backlight system 3*d* is diffused in the sheet polarizer 3*c*. The diffused light passes through the LCD panel 3*b*. At this point, light emitted from the screen of the display 3 is diffused not only in a normal direction with respect to the screen but also in all directions. Therefore, fixed or higher luminance and a fixed or higher contras ratio are maintained not only in the front direction but also in oblique directions of the screen. A displayed image on the display 3 can be visually recognized from a wide range. Such a state is hereinafter referred to as wide angle of field (first angle of field) state.

On the other hand, in a state in which the voltage signal is applied to the sheet polarizer 3*c*, the light emitted from the backlight system 3*d* travels straight in the LCD panel 3*b* without being diffused in the sheet polarizer 3*c*. At this point, the light emitted from the screen of the display 3 is limited to only a substantial normal direction with respect to the screen. Therefore, when the display 3 is viewed from the front, the luminance and the contrast of the display screen are maintained at degrees same as those obtained when the voltage is not applied. However, when the display 3 is viewed from oblique directions, the luminance markedly falls compared with that obtained when the display 3 is viewed from the front. Therefore, a displayed image cannot be visually recognized. In the following explanation, a state in which the angle of field is narrow compared with the wide angle of field state in this way is hereinafter referred to as narrow angle of field (second angle of field) state.

As a main function, the control unit 21 has sections (1) and (2) explained below.

(1) A checkout processing section that performs checkout processing for a commercial transaction. In this embodiment, the checkout processing section starts the checkout processing according to the input of commodity information from the vertical scanner 4 or the hand-held scanner 11 and ends the checkout processing according to the declaration of closing of the commodity information input.

(2) An angle-of-field control section that causes, when the checkout processing is started by the checkout processing section, the sheet polarizer 3*c* to operate and set the angle of field of the display screen of the display 3 to a narrow angle of field and causes, when the checkout processing by the checkout processing section ends, the sheet polarizer 3*c* to operate and set the angle of field of the display screen of the display 3 to a wide angle of field.

The checkout processing by the commodity sales data processing apparatus 1 is explained. When a customer performs the checkout processing, first, the customer places a shopping basket including purchased commodities on the commodity placing table 13. At this point, the total weight of all the commodities is measured by the unsettled side measuring unit 36. Subsequently, the customer sequentially takes out the commodities from the shopping basket and reads barcodes attached to the commodities with the vertical scanner 4 or the hand-held scanner 11 or touch-operates the screen according to screen display of the display 3 to input commodity information. In other words, the vertical scanner 4, the hand-held scanner 11, and the touch panel 3*a* of the display 3 function as a commodity-information input unit in this embodiment.

The checkout processing is started when the commodity information is input in this way. The input commodity information is sequentially registered in the RAM 23 as purchased commodities. The commodities for which the input of the commodity information is completed are transferred to a basket or a bag placed on the commodity placing table 14. When the input of the commodity information is completed for all the commodities, the customer touch-operates a subtotal key displayed on the screen of the display 3 and declares completion of the input of the commodity information. At this point, the total amount of the transaction is calculated on the basis of the commodity information registered in the RAM 23 and displayed on the display 3. The total weight of all the commodities placed on the commodity placing table 14 is measured by the settled side measuring unit 37. The control unit 21 determines whether the total weight measured by the settled side measuring unit 37 and weight measured by the unsettled side measuring unit 36 at the beginning of the checkout processing coincide with each other. When the total weight measured by the settled side measuring unit 37 and the weight measured by the unsettled side measuring unit 36 at the beginning of the checkout processing do not coincide with each other, the probability that commodities not subjected to the checkout processing are about to be illegally carried out is high. Therefore, the control unit 21 notifies to that effect by, for example, displaying a warning message on the display 3.

On the other hand, when the total weight measured by the settled side measuring unit 37 and the weight measured by the unsettled side measuring unit 36 at the beginning of the checkout processing coincide with each other, the control unit 21 causes the display 3 to display a message for requesting the input of the price in the coin input port 7 or the bill input port 9. When money is input in the coin input port 7 and the bill input port 9, the coin input unit 32 and the bill input unit 34 count an input amount. When a closing key displayed on the display 3 is operated and closing of the checkout processing is declared, the coin discharge unit 33 and the bill discharge unit 35 discharge a difference between the input money and the price to the coin discharge port 8 and the bill discharge port 10. At the same time, the printer 31 issues a receipt, on which content of the transaction is printed, from the receipt issue port 6. Consequently, a series of checkout processing is completed.

Processing for switching the angle of field of the display 3 is explained below.

The display screen of the display 3 is usually set in the wide angle of field state. The display screen of the display 3 is switched to the narrow angle of field state according to the start of checkout processing.

Figure 3:
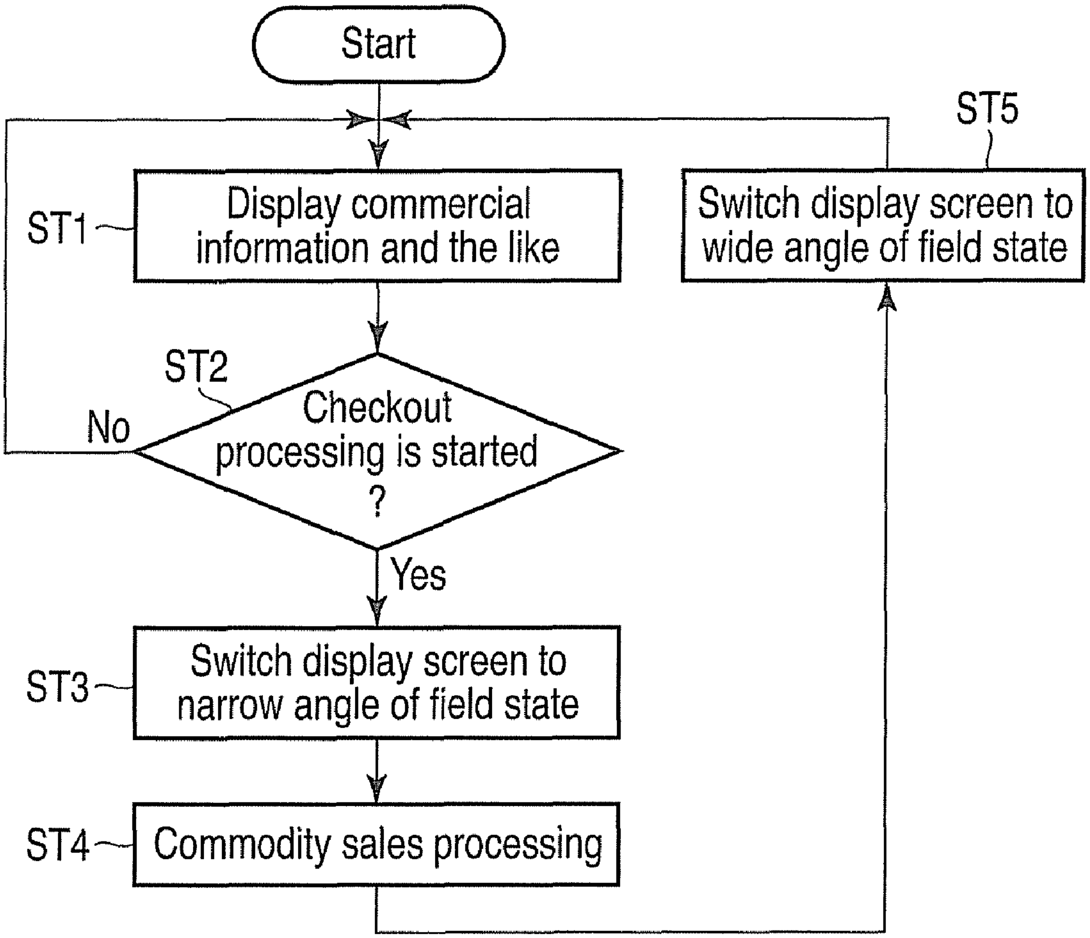
FIG. 3 is a flowchart of angle-of-field switching processing executed by a control unit in the embodiment.

FIG. 3 is a flowchart of processing for switching the angle of field of the display 3 executed by the control unit 21. This processing is executed on the basis of an operation program stored in the ROM 22.

While staying on standby for checkout processing, the control unit 21 outputs image data concerning commercial information of commodities and the store, guidance of the operation method, and the like to the LCD controller 24 (Act 1). When the LCD controller 24 receives the output of the image data from the control unit 21, the LCD controller 24 outputs a display signal based on the image data to the LCD panel 3*b*. The LCD panel 3*b* selectively displays an image according to the display signal output from the LCD controller 24. The commercial information is commercial information received from a store server connected to a store network via the communication unit 12 in advance and stored in storing means such as the RAM 23 or a hard disk drive (not shown).

The control unit 21 determines whether checkout processing is started (Act 2). When commodity information is not input by the vertical scanner 4 or the hand-held scanner 11 or touch operation of the touch panel 3*a*, the control unit 21 determines that the checkout processing is not started (No in Act 2) and continuously displays the commercial information or the like on the display 3. The input of the commodity information by the touch operation of the touch panel 3*a* is performed by touch operation of a commodity selection button displayed on the screen.

On the other hand, when barcodes attached to commodities are read by the vertical scanner 4 or the hand-held scanner 11 or the commodity information is input by the touch operation of the touch panel 3*a*, the control unit 21 determines that the checkout processing is started (Yes in Act 2). The control unit 21 outputs a control signal indicating that the display screen of the display 3 should be shifted to the narrow angle of field state to the sheet polarizer 3*c* (Act 3). The sheet polarizer 3*c* that receives this signal starts the application of a predetermined voltage signal to the sheet polarizer 3 itself. The display screen of the display 3 is switched to the narrow angle of field state.

After switching the display screen of the display 3 to the narrow angle of field state, the control unit 21 performs the checkout processing for the commodities as explained above (Act 4). When the closing of the transaction is declared by the operation of the closing key (a closing declaring section) displayed on the display 3 and predetermined time elapses after a series of commodity checkout processing is completed, the control unit 21 outputs a control signal indicating that the display screen of the display 3 should be shifted to the wide angle of field state to the sheet polarizer 3*c* (Act 5). The sheet polarizer 3*c* that receives this signal stops the application of the predetermined voltage signal. The display screen of the display 3 is switched to the wide angle of field state. Thereafter, the control unit 21 returns to the operation in Act 1, displays the commercial information and the guidance information on the display 3, and waits for the start of the next checkout processing.

As explained above, the commodity sales data processing apparatus 1 according to this embodiment sets the angle of field of the display screen of the display 3 to the narrow angle of field while the checkout processing is performed. Therefore, it is possible to reduce the probability that, when information of commodities that a customer is about to purchase is displayed on the display 3, content of the information is peeped by other customers and the like.

The angle of field of the display screen of the display 3 is switched to the wide angle of field when the checkout processing is not performed. Therefore, the visibility of the display screen is kept high when commercial information of the store and commodities and guidance information of operation are displayed and when processing other than the checkout processing is performed. In other words, the effectiveness of advertising and the operability of the commodity sales data processing apparatus 1 are not deteriorated.

In the explanation of the embodiment, the present invention is applied to the self-type commodity sales data processing apparatus 1. However, the present invention may be applied to a display on an operator side or a customer side of a commodity sales data processing apparatus that is not the self type. Even in such a case, effects same as those in the embodiment can be realized, for example, the probability that content displayed on the display in checkout processing is peeped can be reduced.

In the above explanation of the embodiment, the sheet polarizer 3*c* is arranged between the LCD panel 3*b* and the backlight system 3*d*. However, an arrangement position of the sheet polarizer 3*c* is not limited to this. For example, the sheet polarizer 3*c* may be arranged between the touch panel 3*a* and the LCD panel 3*b*.

In the above explanation of the embodiment, the LCD is adopted for the display 3. However, a display system of the display 3 is not limited to the LCD. Other display elements such as an FED (Field Emission Display), a plasma display, an EL (Electro Luminescence) display, and a CRT (Cathode Ray Tube) display may be adopted.

In the above explanation of the embodiment, the angle of field of the display screen of the display 3 is set to the wide angle of field or the narrow angle of field. However, the angle of field of the display screen of the display 3 can be set in a larger number of stages. For example, the sheet polarizer 3*c* that can set the angle of field in three stages including an intermediate angle of field between the narrow angle of field and the wide angle of field in addition to the narrow angle of field and the wide angle of field is adopted. The angle of field of the display screen of the display 3 is controlled to be set to any one of the angles of field in the three stages according to, for example, the start of checkout processing or the start of processing for displaying particularly highly confidential information in the checkout processing. It is possible to set a detailed angle of field more corresponding to a state of use by adopting such a configuration.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. A self-type commodity sales data processing apparatus comprising:

a display unit configured to display various kinds of information and have information input function;

an angle-of-field setting unit configured to set an angle-of-field of a display screen of the display unit to a first angle-of-field to display commercial information that is useful for customers in the vicinity of the display unit or a second angle-of-field that is narrower than the first angle-of-field, the second angle-of-field to display commodity information that pertains only to a customer who requests checkout processing, in accordance with a control signal to be input, wherein the commercial information is received from a store server via a store network;

a checkout processing section configured to perform checkout processing for a commercial transaction, wherein the checkout processing section is operated by the customer;

an angle-of-field control section configured to output the control signal for setting the angle-of-field of the display screen of the display unit to the second angle-of-field to the angle-of-field setting unit when the checkout processing is started in response to the customer operating the checkout processing section and output the control signal for setting the angle-of-field of the display screen to the first angle-of-field upon expiration of a predetermined period of time after checkout processing by the customer operating at the checkout processing section ends;

a commodity-information input unit configured to input commodity information, wherein the checkout processing section starts the checkout processing according to the input of the commodity information by the commodity-information input unit; and a closing declaring unit configured to declare closing of the checkout processing, wherein the checkout processing section ends the checkout processing according to the declaration of the closing by the closing declaring unit.

2. The apparatus according to claim 1, wherein the commodity-information input unit is a scanner that optically reads a barcode.

3. The apparatus according to claim 1, wherein a touch panel is provided on the display screen of the display unit.

4. The apparatus according to claim 3, wherein the angle-of-field setting unit is provided further on an inner side of the display unit than the touch panel.

5. A method of controlling a self-type commodity sales data processing apparatus including a display unit configured to display various kinds of information and have information input functionality, a checkout processing section configured to perform checkout processing for a commercial transaction, and an angle-of-field setting unit configured to set an angle-of-field of a display screen of the display unit to a first angle-of-field or a second angle-of-field narrower than the first angle-of-field, the method comprising:

causing the angle-of-field setting unit to operate and set the angle-of-field of the display screen of the display unit to the second angle-of-field when, according to a control signal input, the checkout processing is initiated by the checkout processing section, the second angle-of-field displaying, in response to operation of the checkout processing section by a customer, commodity information pertaining only to the customer performing checkout processing; and causing the angle-of-field setting unit to operate and set the angle-of-field of the display screen of the display unit to the first angle-of-field when, according to a control signal input, expiration of a predetermined period of time after the checkout processing by the customer at the checkout processing section ends, the first angle-of-field displaying commercial information being useful for customers in the vicinity of the display unit, wherein the commercial information being received from a store server via a local network.

* * * * *